(12) United States Patent
Wang et al.

(10) Patent No.: US 7,238,114 B2
(45) Date of Patent: Jul. 3, 2007

(54) BOOT FOR A JOINT

(75) Inventors: Shen-Ling Allen Wang, Northville, MI (US); Robert Leslie Cassell, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 238 days.

(21) Appl. No.: 10/989,706

(22) Filed: Nov. 16, 2004

(65) Prior Publication Data

US 2006/0105846 A1    May 18, 2006

(51) Int. Cl.
*F16D 3/84* (2006.01)
(52) U.S. Cl. ...................... 464/173; 277/635
(58) Field of Classification Search ........... 464/173, 464/175, 174; 277/635, 634, 636, 637–639
See application file for complete search history.

(56) References Cited

U.S. PATENT DOCUMENTS

| | | | | |
|---|---|---|---|---|
| 3,830,083 A | * | 8/1974 | Hadick et al. | 464/175 |
| 5,066,159 A | * | 11/1991 | Urbach | 277/635 X |
| 5,725,433 A | | 3/1998 | Kudo et al. | |
| 6,089,574 A | * | 7/2000 | Sadr et al. | 277/636 |
| 6,093,108 A | * | 7/2000 | Moulinet | 464/173 |
| 6,334,620 B1 | * | 1/2002 | Reetz et al. | 277/635 |
| 6,547,669 B1 | * | 4/2003 | Neviani | 464/175 |
| 2005/0026706 A1 | * | 2/2005 | Kashiwagi et al. | 464/175 |

* cited by examiner

*Primary Examiner*—Greg Binda
(74) *Attorney, Agent, or Firm*—Jennifer M. Brumbaugh; Mick A. Nylander

(57) ABSTRACT

A boot for a joint is provided having an aperture and at least one protrusion and at least one indentation disposed about an inside diameter of the aperture.

13 Claims, 5 Drawing Sheets

BOOT FOR A JOINT

BACKGROUND

Conventional constant velocity joints include a boot constructed of an elastic material such as silicone or rubber that, for example, may be used to seal internal components and lubricants from an external environment. Commonly, a boot is used to protect internal components. The boot permits a shaft to pass from an internal location to an external environment, typically through an aperture provided in the boot. The aperture is often designed to snugly fit against the shaft so that the boot can rotate with the shaft.

While the boot may sufficiently seal the internal components of the joint under most conditions, challenges exist. Under some conditions, the contacting portions of the aperture of a boot may slip against the shaft. One such circumstance is when the joint is exposed to extreme temperature conditions. Slippage may be caused by a number of factors, including shrinkage of the outside diameter of the shaft or imperfections in the associated mating surfaces. In addition, typical boot materials may experience a reduction in volume at extremely low temperatures, which can result in a reduced clamping load exerted upon the boot and the shaft by an associated clamp. Such conditions can, for example, permit greater spacing between the aperture and the shaft and/or solidification of the lubricants inside the joint. The present invention was developed in light of these and other potential challenges.

SUMMARY

To address these and other challenges, the present invention provides a boot for a joint having an aperture and at least one protrusion and one indentation disposed about an inside diameter of the aperture.

The present invention will be more fully understood upon reading the following detailed description in conjunction with the accompanying drawings.

BRIEF DESCRIPTION OF THE DRAWINGS

Embodiments of the invention will now be described, by way of example, with reference to the accompanying drawings, wherein.

DETAILED DESCRIPTION

Figure 1:
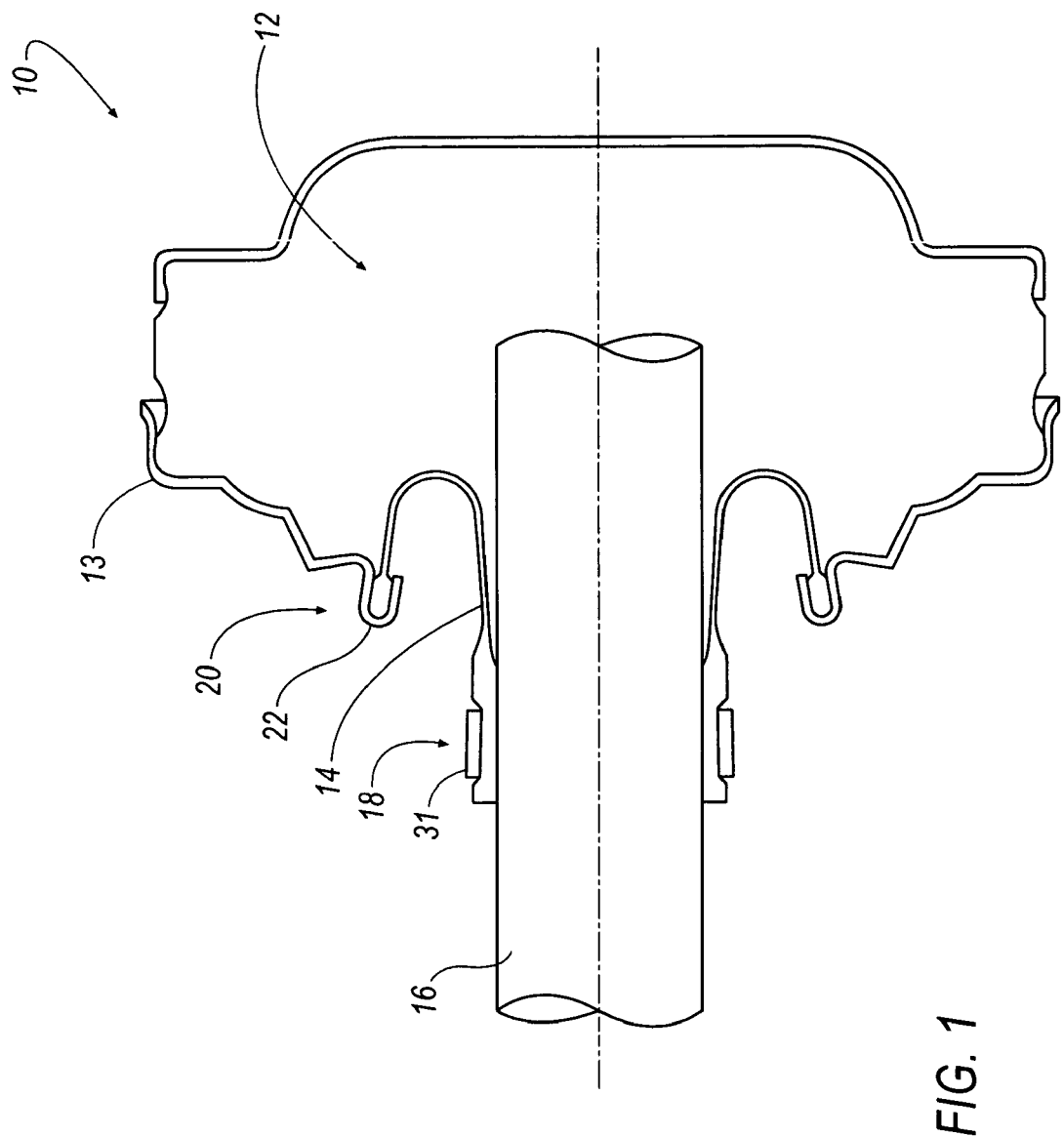
FIG. 1 is a schematic view of a joint.

Referring to FIG. 1, a constant velocity joint 10 is shown having internal components and/or lubricants (collectively identified as element 12) within a joint portion 13, a boot 14, and a shaft 16. The constant velocity joint 10 may be, for example, a fixed joint, a plunging joint, slip splines, or other types of joints.

The boot 14 is constructed of an elastic material such as rubber or silicone and has an aperture 32 (see FIG. 2) that encapsulates the shaft 16. The boot 14 is connected (e.g., clamped) at a region 20 by a boot can 22 joined to the constant velocity joint 10. The boot 14 is typically intended to be in a non-slip arrangement with the shaft 16 at a region 18. Therefore, as will be understood by one skilled in the art, during proper operation, shaft 16 and boot 14 generally rotate in unison.

Figure 2:
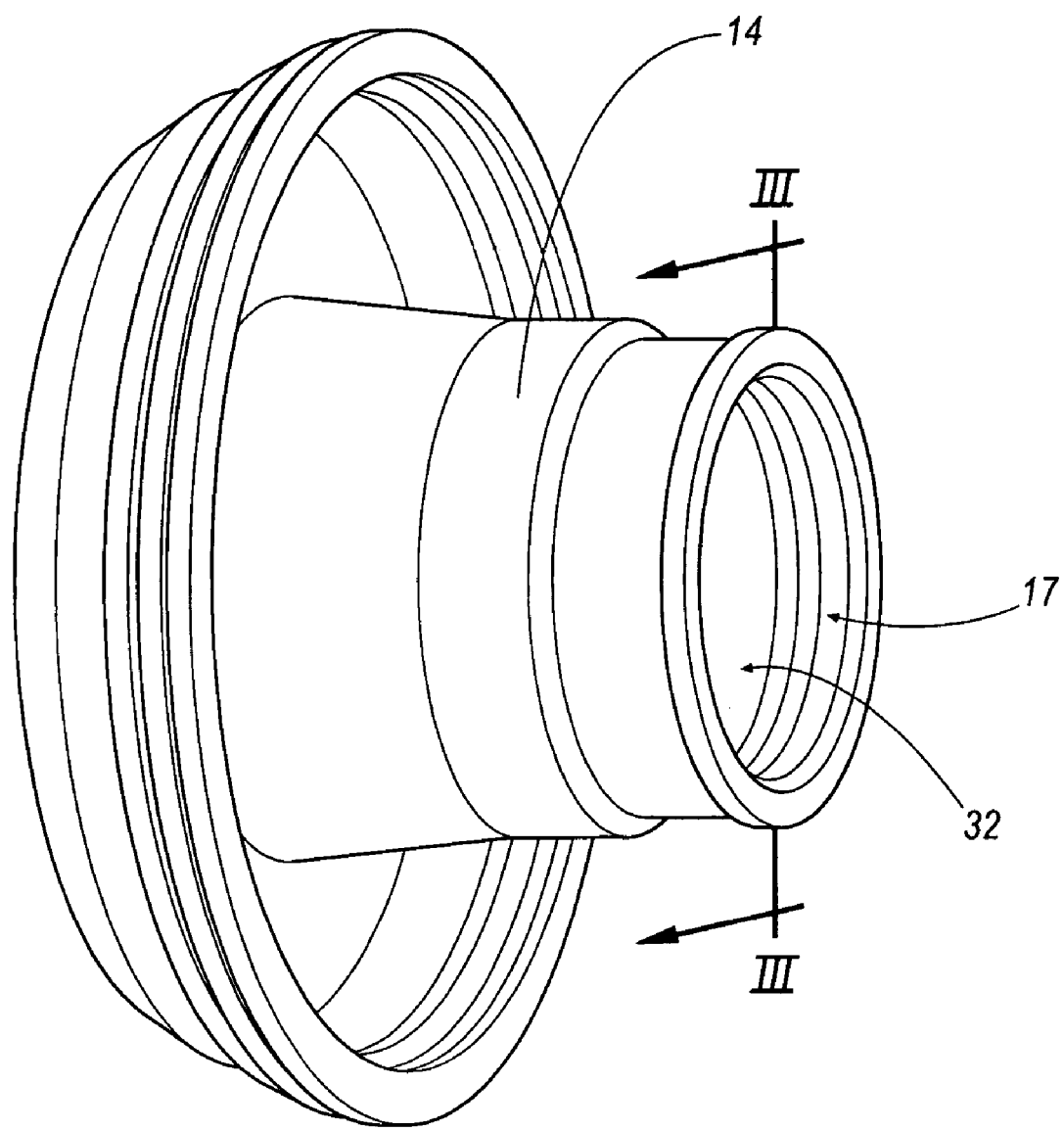
FIG. 2 is a perspective view of an embodiment of a boot for use with a joint.
Figure 3:
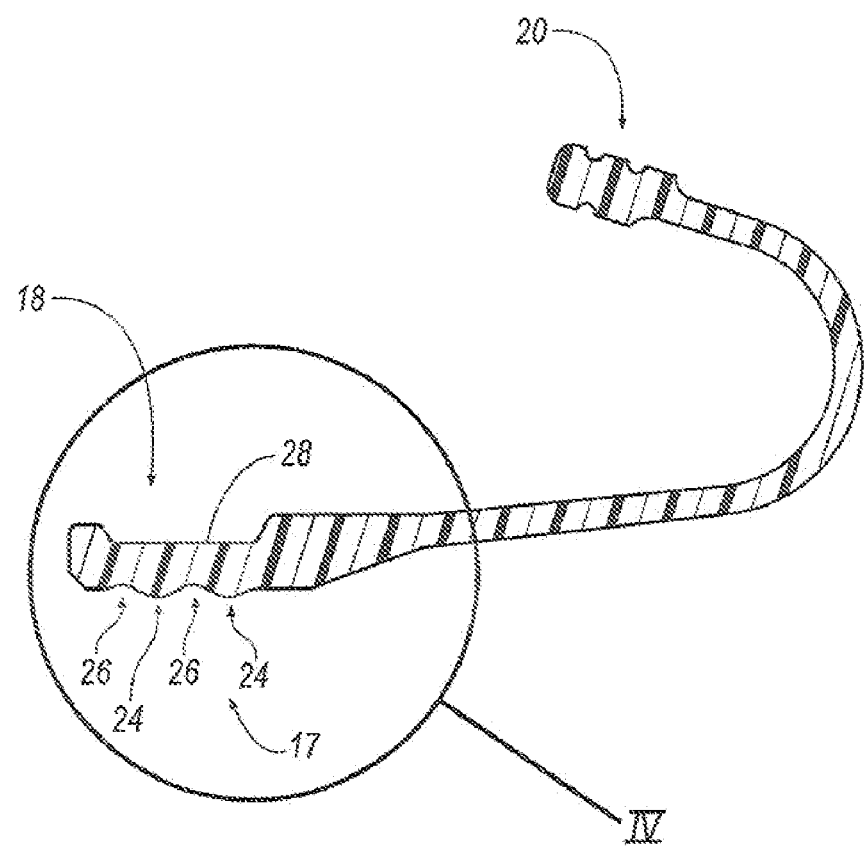
FIG. 3 is a sectional view along III-III of the boot in FIG. 2.

Referring now to FIGS. 2 and 3, a perspective view of boot 14 is shown in greater detail. The aperture 32, which contacts and at least partially encapsulates the shaft 16, includes a set or series of protrusions and indentations 17. As will be described in greater detail, a portion of the inside wall of aperture 32 frictionally engages at least a segment of the outer surface of the shaft 16 through the application of protrusions and indentations 17. In FIG. 3, a cross-section taken along III-III of FIG. 2 is provided to illustrate an example of a possible configuration of protrusions and indentations 17, as well as generally identifying regions 18 and 20 of the boot 14.

Region 18 coincides with the portion of the boot 14 proximate the shaft 16 where protrusions and indentations 17 engage, and typically, frictionally engage, the shaft 16. Region 20 coincides with the portion of the boot 14 connected to or engaged with the boot can 22. The connection or engagement of the boot 14 to the boot can 22 may be effectuated by crimping, clamping or other known means.

Figure 4:
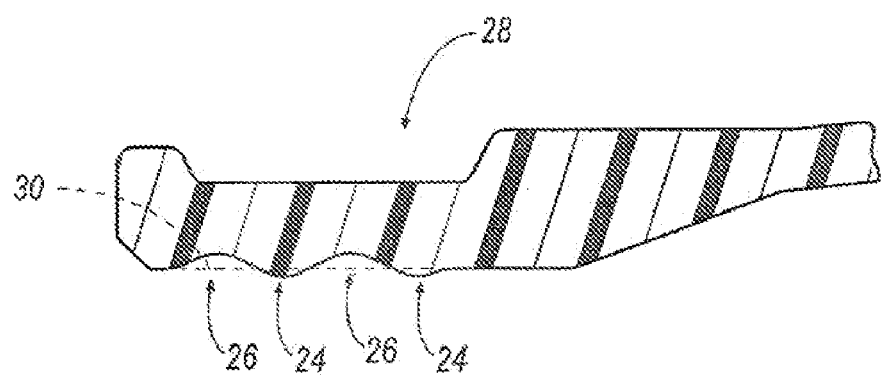
FIG. 4 is a magnified view of encircled area IV in FIG. 3.

In the embodiment illustrated in FIG. 4, protrusions and indentations 17 are shown as generally comprising a plurality of protrusions 24 and indentations 26. If desired, a receiving portion 28 can be included about an outer portion of region 18 of the boot 14 to provide a location for receiving a clamp 31 (see e.g., FIG. 1). The clamp 31 can be positioned around the region 18 and, if desired, can clamp the protrusions and indentations 17 against the shaft 16.

A diameter line 30 defines a base-line inside diameter of the boot 14 at or about the portion of the boot 14 associated with region 18 that is intended to engage the shaft 16. More specifically, in region 18, boot 14 can be configured so that the inside diameter of the aperture closely approximates the outside diameter of the shaft 16, or is at least within an acceptable range to functionally engage the shaft. However, when the boot 14 is positioned over the shaft 16, the actual diameter line (which is dictated by the outer surface diameter of the shaft insofar as that solid surface cannot be penetrated by a protrusion) may be different than diameter line 30. In some embodiments and/or under some conditions, the actual outside diameter of shaft 16 may be somewhat smaller than diameter line 30. For example, under some conditions, the outside diameter of the shaft 16 may shrink during cold weather conditions, resulting in an overall smaller diameter than the diameter line 30. In other embodiments, the outside diameter of the shaft 16 may be larger than the diameter line 30.

A feature of the present invention is the ability for protrusions and indentations 17 to help ensure sealing functionality while compensating for imperfections associated with mating surfaces (such as those associated with the boot and/or the shaft), including variations in diameters. For example, during cold tests, the material properties of the boot 14 associated with one or more protrusions 24 can help maintain engagement between the shaft 16 and boot 14 and prevent slippage of the boot 14 during cold tests, when there may be material shrinkage associated with the components. Other features will also be recognized by one skilled in the art.

As illustrated, by way of example in FIG. 4, protrusions 24 generally extend beyond the diameter line 30 in the direction of the shaft 16. Conversely, indentations 26 generally are spaces or voids that extend away from the diameter line 30 and away from the shaft 16. In one embodiment of the invention, the total amount of volume defined by the volume of indentations 26 above diameter line 30 is greater than the total amount of volume defined by the protrusions 24 extending below beyond diameter line 30. As will be described in greater detail, such a volumetric relationship, and the fact that most rubber and/or other boot materials are substantially incompressible (at least under typical operational conditions associated with the joint), helps ensure that enough room exists within the indentations 26 to receive material from the boot 14 (including material from the protrusions) that may be shifted or pushed into the indentations 26 when the boot 14 is placed over the shaft 16 or is otherwise compressed toward the shaft 16.

It should be noted that the number of indentations and protrusions may be varied from the exemplary configurations illustrated, for instance, to optimize operational performance. For example, under some circumstances, an equal number of indentations and protrusions may be provided, including, for instance, only one indentation and only one protrusion. However, in other embodiments, more indentations may be provided than protrusions, or more protrusions may be provided than indentations. Moreover, the shape and configuration of the protrusions and indentations may also be varied, as desired, in both different boots or the same boot, from those illustrated in the exemplary embodiments. For example, the shape of the configuration of the indentations and protrusions does not necessarily need to be curved or ring-shaped, but instead, may be saw-toothed or embody other shapes or profiles, such as axially oriented indentations and protrusions or individual point indentations and protrusions that are distributed randomly along the inner surface of the boot 14. Further, various combinations of protrusions and/or indentations having different sizes or shapes/surface contours can be employed in a configuration to optimize the performance of a given boot with respect to a given shaft.

Additionally, although the indentations and protrusions are shown being generally adjacent to each other, it will be understood that indentations may spaced or positioned at a distance from one or more protrusions provided that the material of boot 14 that is designed to be moved or reconfigured with respect to the indentation (or indentations), such as in response to compression of the protrusions, can be sufficiently accommodated as desired. Moreover, one skilled in the art will readily recognize other configurations that may be used in connection with the present invention as well.

Figure 5:
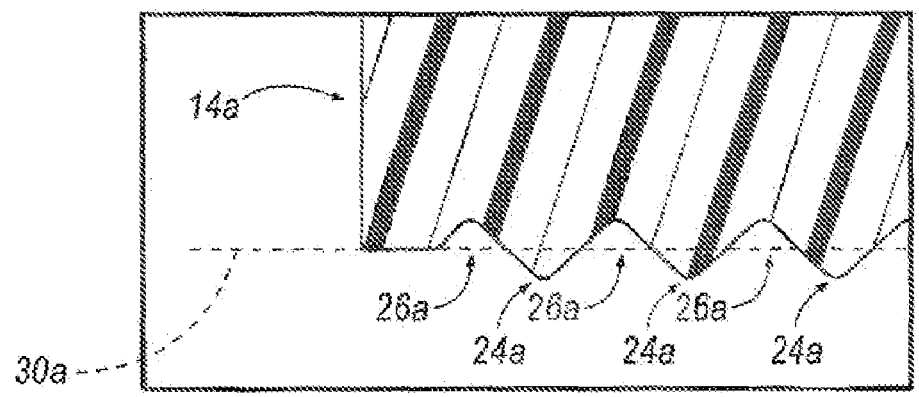
FIG. 5 is a cross-sectional view of of a portion of a boot prior to a shaft being inserted therein.
Figure 6:
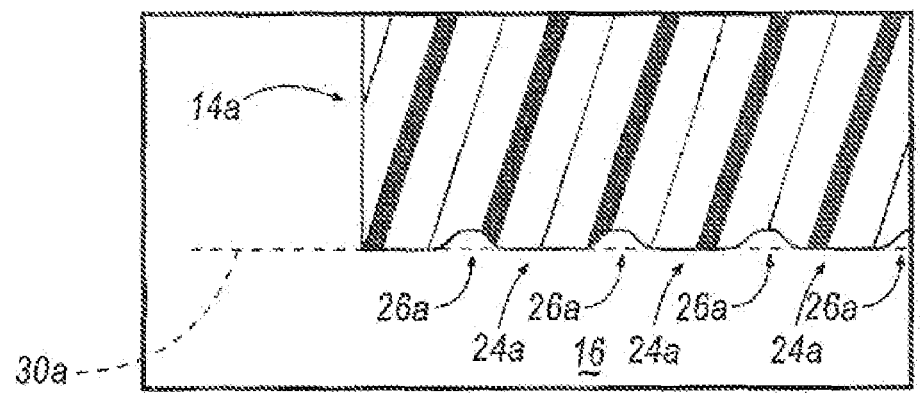
FIG. 6 is a cross-sectional view of the portion of the boot of FIG. 5 after a shaft has been inserted therein.

Referring to FIGS. 5 and 6, an exemplary application of the present invention is shown and described. FIG. 5 depicts an embodiment of the boot 14a that includes four indentations 26a and three protrusions 24a. In this Figure, the boot 14a is shown before a shaft 16 is positioned within the aperture 32. As can be seen, protrusions 24a extend beyond diameter line 30a toward the intended location of the shaft 16. Likewise, indentations 26a are formed in a direction that extends away from the diameter line 30a into boot 14a to create material spaces or voids.

In FIG. 6, the shaft 16 is generally shown positioned within aperture 32. In this arrangement, the outside diameter of the shaft 16 is substantially equal to, or approximately equal to, diameter line 30a. Consequently, the protrusions 24a are compressed or forced by the outer surface of shaft 16. Because the material comprising the boot is substantially incompressible, the material associated with the protrusions 24a is substantially pressed or forced against other portions of the boot 14a. As previously noted, a clamp 31 (see e.g., FIG. 1) may be employed to assist with the application of the compression associated between the boot and shaft.

In response to compression of the elastic nature of the material that comprises protrusions 24a, when the outer surface of the shaft 16 contacts the boot 14a in region 18, a portion of the material of the boot 14a associated with the protrusions 24a is pressed or forced into the area or voids defined by the indentations 26a. When the outer surface of the shaft 16 extends to or beyond diameter line 30a (in the direction towards the boot), the protrusions 24a will substantially conform (i.e., substantially take on the surface configuration of) the outer surface of the shaft 16 or the diameter line 30a, and the indentations 26a, or voids, will be "filled" by reconfigured material so as to effectively be reduced in size. Because the volume of space associated with the indentations 26a is at least equal to and is commonly configured to be greater than the volume of the protrusions 24a, when compressed by the forces between the boot 14a and the shaft 16, there is enough available room or space associated with the indentations 26a to distribute the extended material of protrusions 24a, particularly when the outer surface of the shaft 16 has a greater diameter than diameter line 30a.

Figure 7:
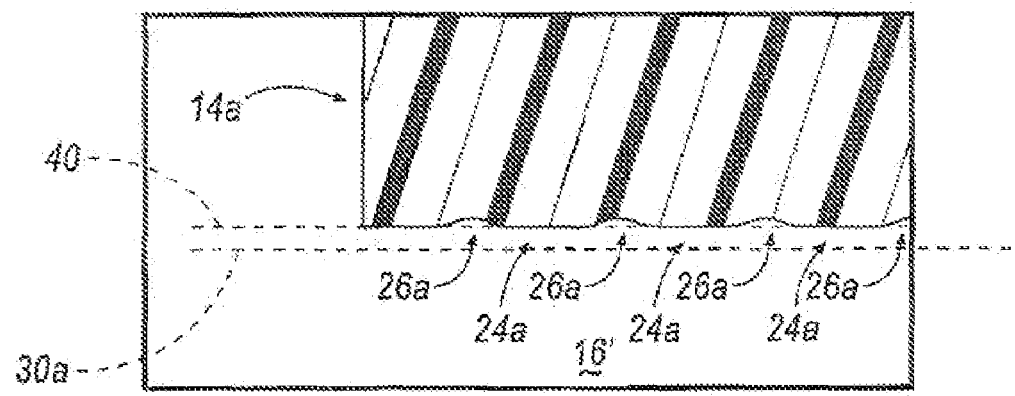
FIG. 7 is a cross-sectional view of a the portion of the boot of FIG. 5 after a shaft has been inserted therein.

As discussed above, the actual diameter of the shaft 16 may be different from the diameter line 30a. For example, in FIG. 7, an actual diameter line 40 of the shaft 16' is shown as being somewhat larger than the diameter line 30a. In this situation, as shown in FIG. 7, more material is moved by protrusions 24a into the area previously defined in connection with the indentations 26a. As a result, the sizes of indentations 26a are reduced from that shown in FIG. 6.

Figure 8:
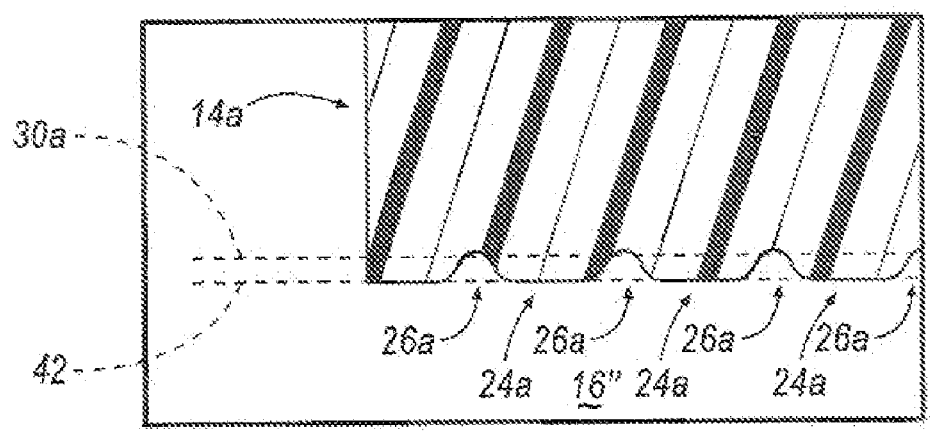
FIG. 8 is a cross-sectional view of the portion of the boot of FIG. 5 after a shaft has been inserted therein.

Likewise, as shown in FIG. 8, the actual diameter of the shaft 16", shown as actual diameter line 42, may be smaller then diameter line 30a. In this situation, less material is reconfigured or repositioned by protrusions 24a into the area of the indentations 26a, thereby resulting in larger area associated with the indentations 26a relative to that shown in FIG. 6.

Figure 9:
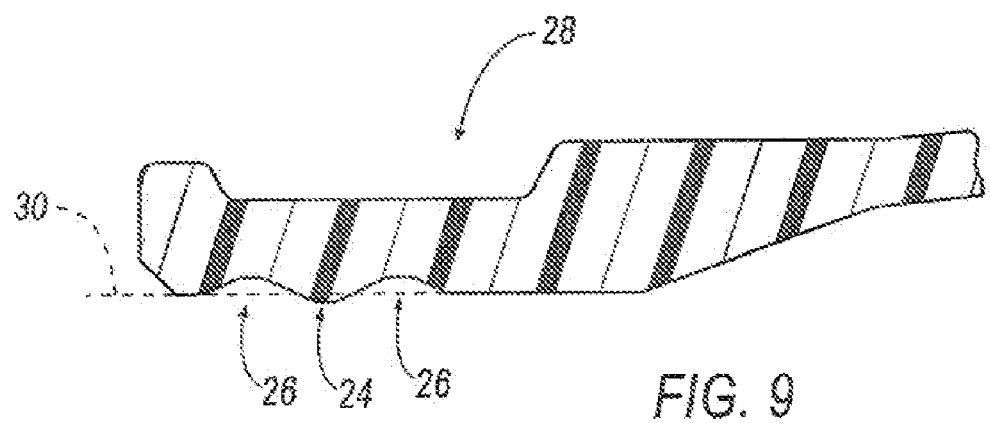
FIG. 9 is a sectional view of a boot, according to another embodiment.
Figure 10:
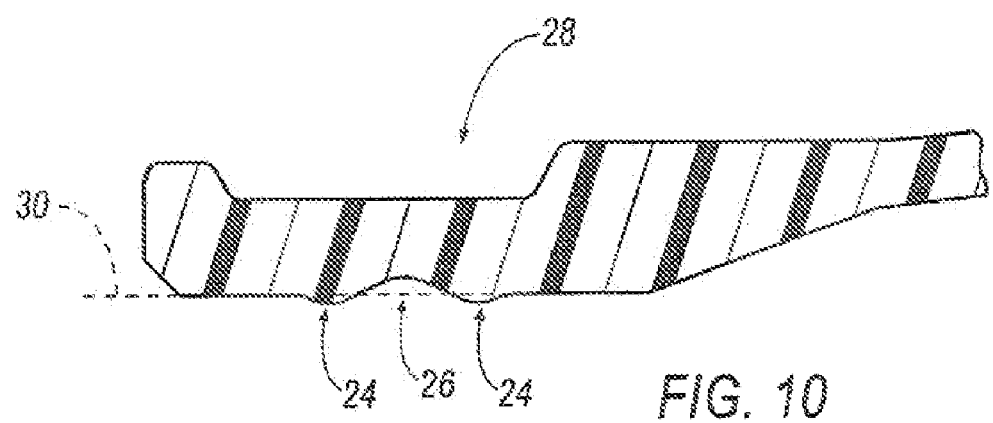
FIG. 10 is a sectional view of a boot, according to a further embodiment.

FIG. 9 illustrates an embodiment of the boot 14 to include one protrusion 24 and two indentations 26. FIG. 10 illustrates an embodiment of the boot 14 to include two protrusions 24 and one indentation 26.

The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. It is intended that the scope of the present methods and apparatuses be defined by the following claims. In accordance with the provisions of the patent statutes, the principles and modes of operation of this invention have been explained and illustrated in exemplary embodiments. However, it must be understood that this invention may be practiced otherwise than is specifically explained and illustrated without departing from its spirit or scope.

What is claimed is:

1. A joint comprising:

a joint portion;

a shaft;

a boot connected to the joint portion and having an inside diameter defined by a diameter line, the boot having an aperture that at least partially engages a portion of the shaft; and a protrusion and an indentation disposed about the inside diameter of the aperture;

wherein the protrusion and the indentation respond to compression of the protrusion relative to the shaft by causing a portion of the boot to move into the area defined by the indentation prior to compression and the portion of the protrusion extends beyond the diameter line such that the portion of the protrusion that extends beyond the diameter line is equal to or less than a volume of the indentation provided on an opposing side of the diameter line when the boot is not connected to the shaft.

2. The joint according to claim 1, wherein the protrusion and the indentation are disposed circumferentially around the inside diameter of the aperture.

3. The joint according to claim 1, wherein the indentation is disposed adjacent to the protrusion.

4. The joint according to claim 1, wherein the boot includes one indentation and a plurality of protrusions, or one protrusion and a plurality of indentations.

5. The joint according to claim 1, wherein the boot includes a plurality of protrusions and a plurality of indentations.

6. The joint according to claim 5, wherein one or more of the protrusions are configured to have a different surface contour prior to compression.

7. The joint according to claim 1, wherein the boot includes a clamp receiving portion.

8. The joint according to claim 7, wherein the clamp receiving portion is disposed on an outer portion of the boot about the protrusion.

9. The joint according to claim 8, further comprising a clamp that is disposed on or about the clamp receiving portion of the boot.

10. A boot for a joint comprising:

a boot having a diameter line and an aperture adapted to at least partially engage a portion of a shaft; and a protrusion and an indentation disposed about an inside diameter of the aperture;

wherein the protrusion and the indentation respond to compression of the protrusion relative to the shaft by causing a portion of the boot to move into the area defined by the indentation prior to compression of the indentation and the portion of the protrusion extends beyond the diameter line such that the portion of the protrusion that extends beyond the diameter line is equal to or less than a volume of the indentation provided on the opposing side of the diameter line when the boot is not connected to the shaft.

11. The boot according to claim 10, wherein the protrusion and the indentation are disposed circumferentially around the inside diameter of the aperture.

12. The boot according to claim 11, wherein the indentation is disposed adjacent the protrusion.

13. The boot according to claim 10, wherein the boot includes a plurality of protrusions and a plurality of indentations.

* * * * *